April 14, 1970   O. T. FULGHUM, JR   3,506,043
MOUNTING ARRANGEMENT FOR TIMBER SHEARS
Filed June 3, 1968   5 Sheets-Sheet 1

INVENTOR
Oscar Thomas Fulghum Jr.

BY Cushman Darby & Cushman
ATTORNEYS

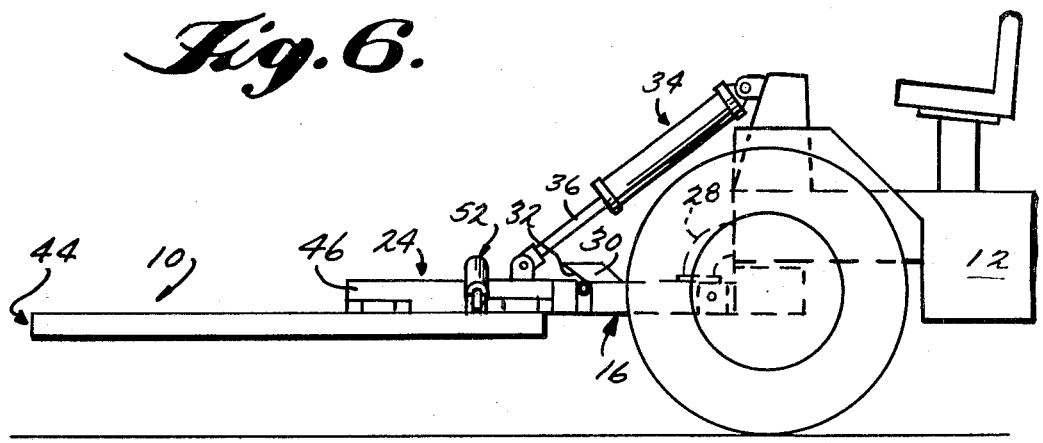
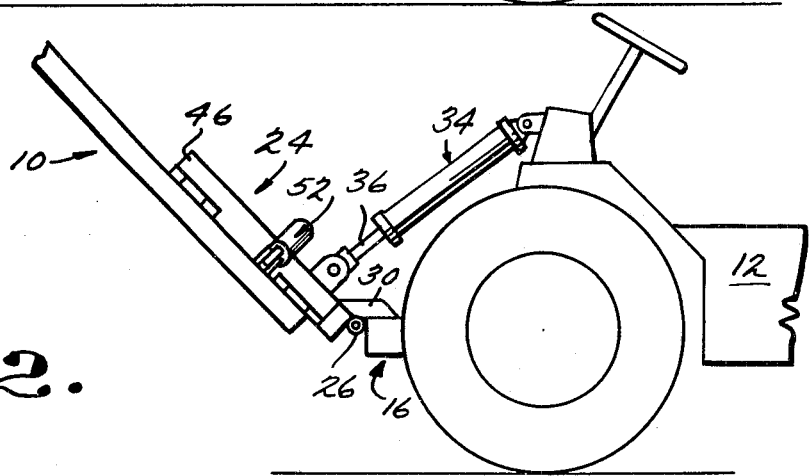
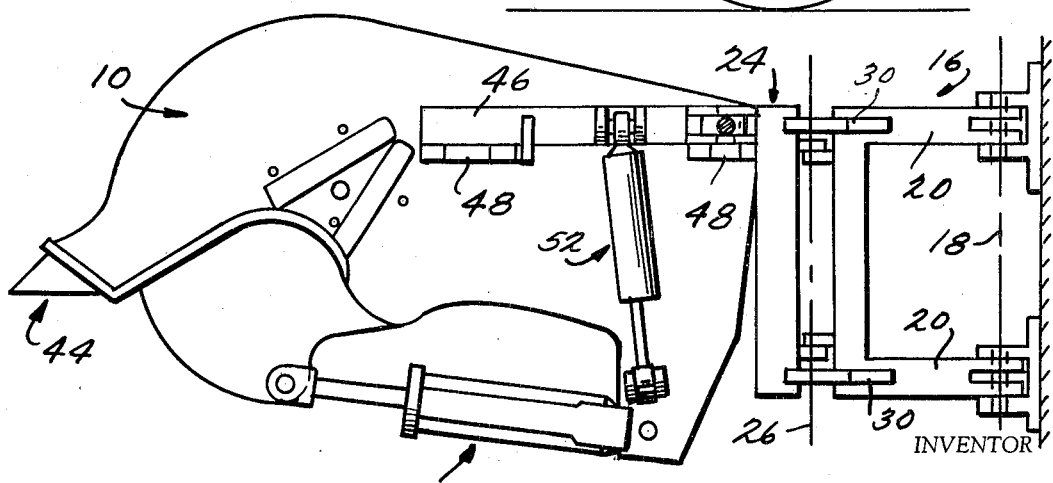

April 14, 1970   O. T. FULGHUM, JR   3,506,043
MOUNTING ARRANGEMENT FOR TIMBER SHEARS
Filed June 3, 1968   5 Sheets-Sheet 3
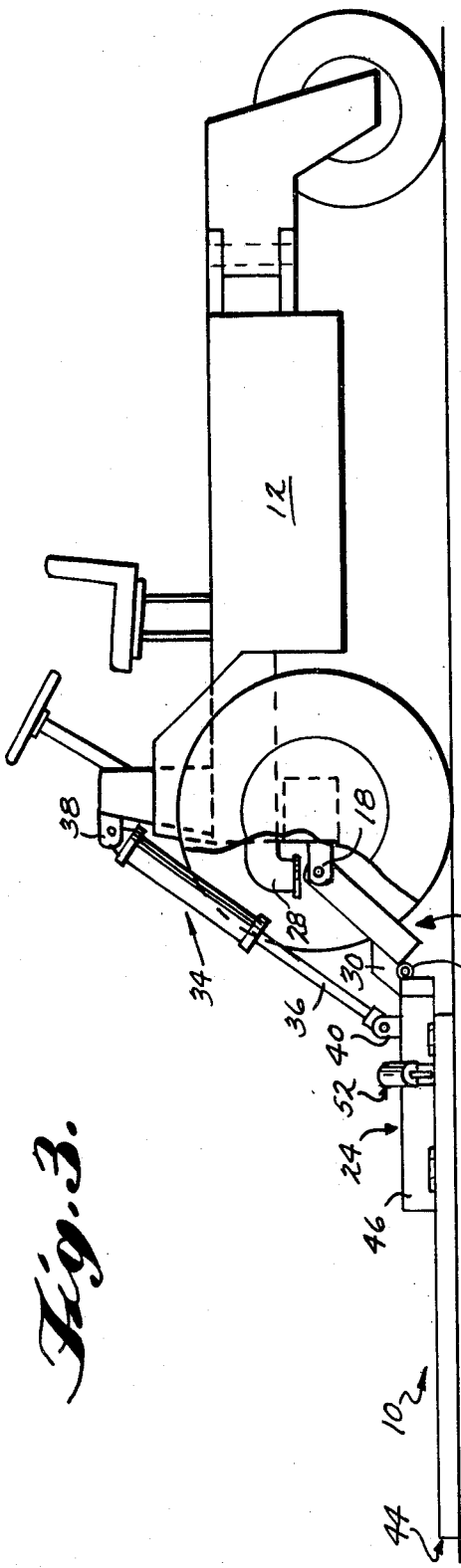
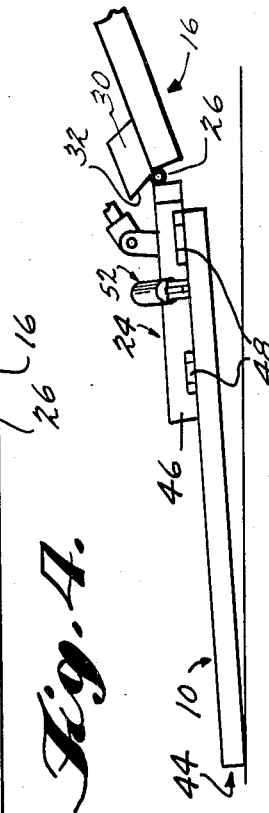
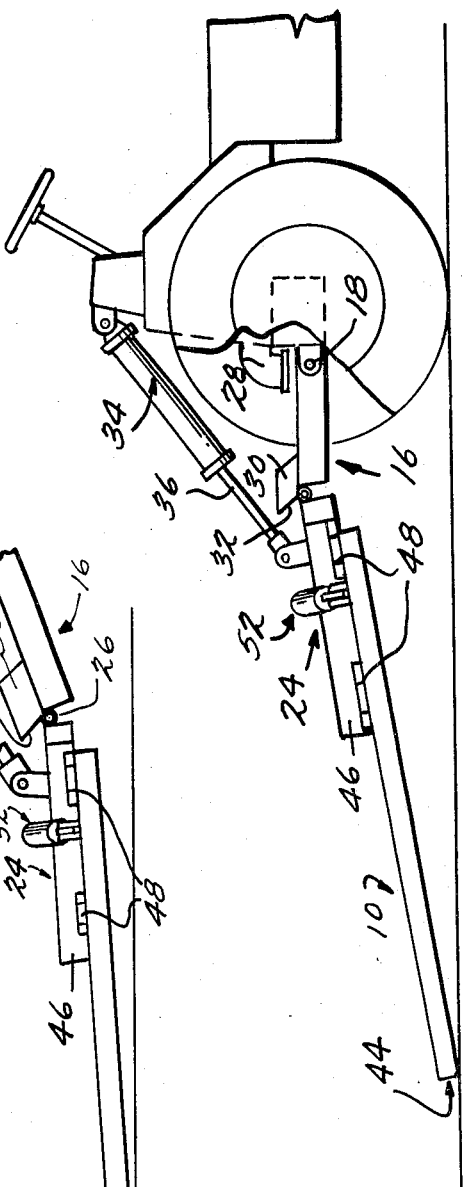
INVENTOR
Oscar Thomas Fulghum, Jr.
BY Cushman, Darby & Cushman
ATTORNEYS April 14, 1970     O. T. FULGHUM, JR     3,506,043
MOUNTING ARRANGEMENT FOR TIMBER SHEARS
Filed June 3, 1968     5 Sheets-Sheet 4
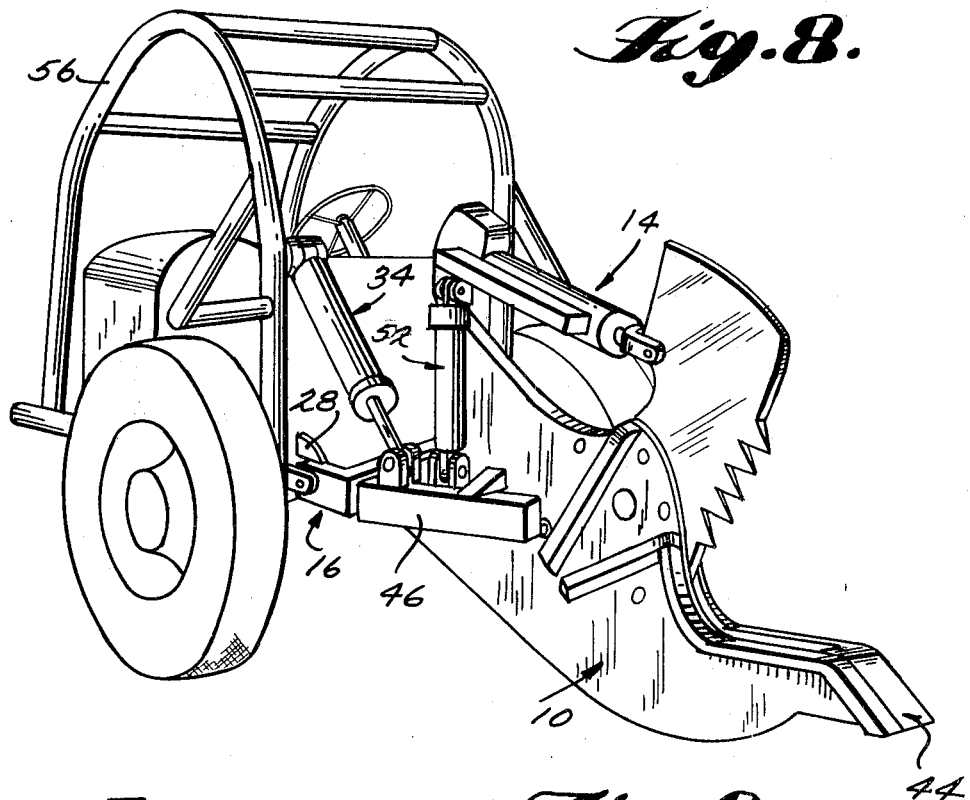
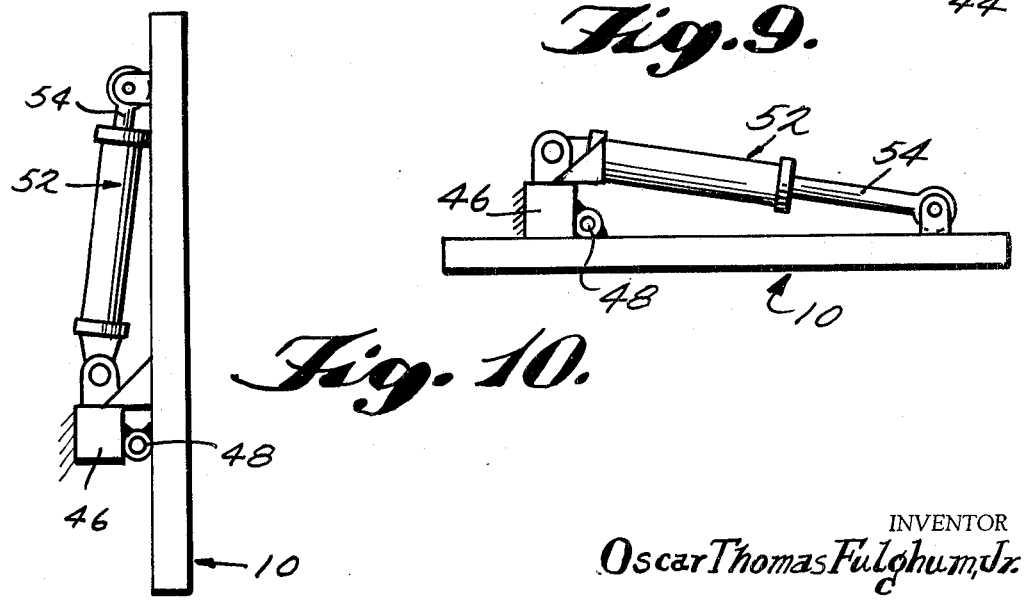
INVENTOR
*Oscar Thomas Fulghum, Jr.*
BY *Cushman, Darby & Cushman*
ATTORNEYS

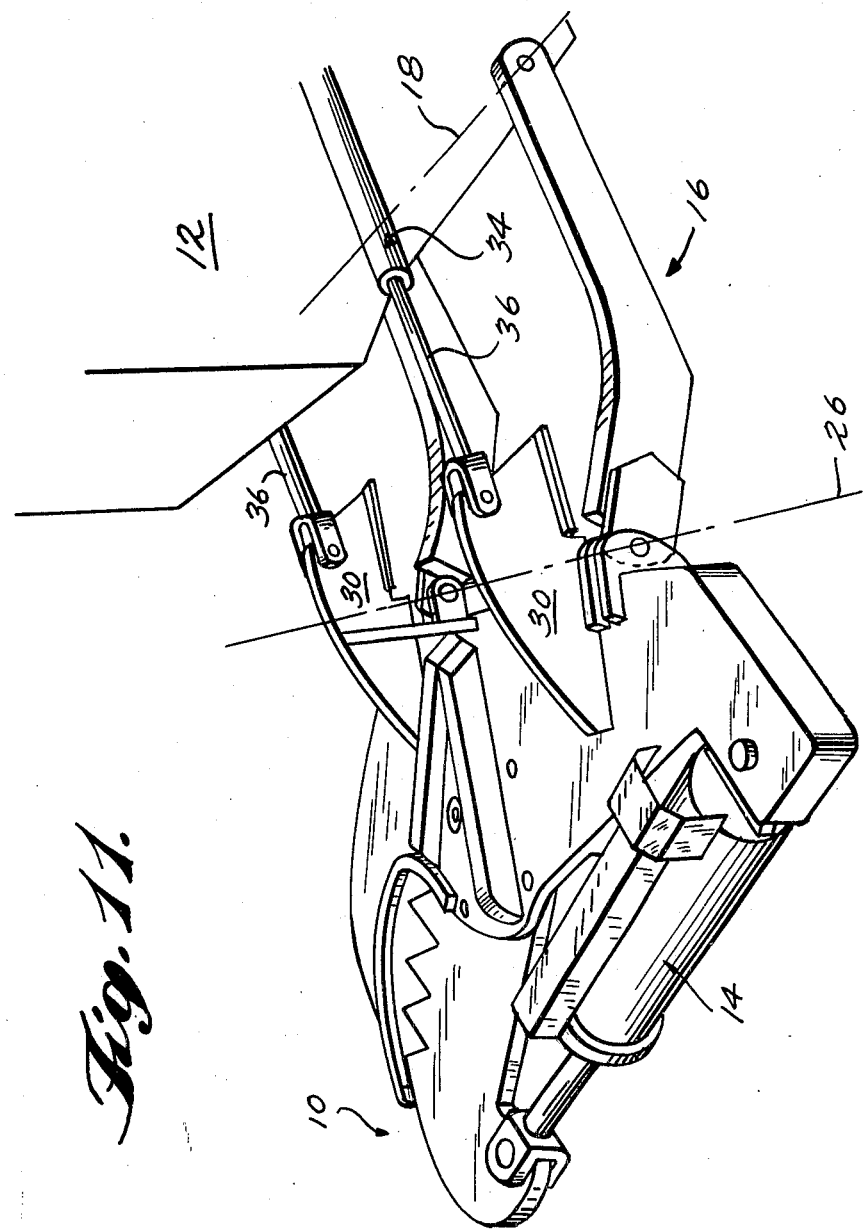

United States Patent Office 3,506,043
Patented Apr. 14, 1970

3,506,043
MOUNTING ARRANGEMENT FOR TIMBER
SHEARS
Oscar Thomas Fulghum, Jr., Wadley, Ga., assignor to
Fulghum Enterprises, Inc., Wadley, Ga., a corporation
of Georgia
Filed June 3, 1968, Ser. No. 733,867
Int. Cl. A01g 23/02
U.S. Cl. 144—34                                    14 Claims

ABSTRACT OF THE DISCLOSURE

A timber shear is mounted on a vehicle so as to be easily movable to a series of positions and angles relative to the vehicle. A support frame means is pivotally connected to structure associated with the vehicle so that the support frame means can move up and down about a horizontally disposed axis relative to the vehicle. A stop means may be provided to limit upward travel of the support frame means, and a timber shear is pivotally connected to the support frame means so that the timber shear can be moved up and down relative to the support frame and the vehicle. A second stop means is positioned between the support frame and the timber shear to limit upward travel of the timber shear relative to the support frame. A single power operated means for lifting and lowering the timber shear is connected between the timber shear and a portion of the vehicle at a point which is between the vehicle and the center of gravity of the timber shear. The single power operated means can effect a series of positive movements of the timber shear and the support frame means relative to the vehicle. In addition, the timber shear can be carried by a separate support frame means which permits rotational movement of the timber shear about an axis which is at right angles to the horizontal mounting axis of the support frame to the vehicle.

BACKGROUND AND BRIEF SUMMARY OF THE INVENTION

This invention relates to improved arrangements for mounting implements on vehicles, and in particular, the invention is concerned with an improved arrangement for mounting a timber shear on a vehicle so that the timber shear is easily and quickly movable to a series of positions and angles relative to the vehicle.

It is known in the prior art to provide some form of mounting means to mount and carry implements on vehicles so that the implements can be operated while attached to vehicles. Also, it is known to mount a cutting or sawing device on a vehicle for the purpose of providing a mobile unit for cutting timber. In fact, it is becoming increasingly important to the timber industry to be able to move mobile equipment into a timber area and to be able to cut trees at an efficient rate with as little labor as possible. Hydraulically actuated timber shears are in common usage for this purpose, and a vehicle-mounted timber shear can provide a very useful combination for economically removing standing timber from a tract of forest land. Representative of prior art patents which illustrate prior arrangements for mounting timber shears, and other implements on vehicles are the following: 2,505,923, 2,560,641, 2,663,952, 2,697,459, 2,814,396, 2,981,301, 3,059,677, 3,074,447, 3,102,563, 3,183,954, 3,294,131, and 3,327,745.

In a consideration of the art of mounting timber shears on vehicles, several important features and standards must be met. The timber shear must be movable relative to the vehicle so that the vehicle and the shear can operate over uneven terrain. Also, the timber shear must be power operated so that a single operator of the vehicle can guide the vehicle and shear and effect a cutting of trees with the shear. The entire mounting arrangement must be of a configuration and construction to withstand heavy loads and stresses, and all control systems for the shear must operate quickly and reliably so that trees can be cut efficiently and safely with little or no danger to the operator. As indicated in a number of the above listed patents, prior art attempts have provided for arrangements wherein a timber shear is mounted at the front or side of a vehicle so as to be operable in several positions or angles relative to the vehicle. However, known prior art systems have required relatively complex arrangements of support structure and hydraulic control devices, and some of the prior art systems have been inadequate for positively placing a timber shear in a desired attitude for cutting timber.

The present invention provides for an improved mounting arrangement for attaching and supporting a timber shear on a vehicle so that the timber shear can be positively controlled and placed in any one of a series of useful positions. Furthermore, the mounting arrangement of the present invention is relatively simple and rugged in construction, and control devices have been reduced to a minimum for effecting a wide range of positions in which the timber shear can operate relative to a vehicle which carries it. The timber shear mounting arrangement of this invention permits an operator to quickly place the shear in a desired attitude and to safely effect a cut of a tree or log in a manner which is economical and acceptable to the timber and lumber industries.

The mounting arrangement of the present invention includes a support frame means which is pivotally connected to structure associated with a vehicle. The support frame means may be connected to the front, or at any other desired location, of the vehicle so as to provide a generally horizontal axis about which the support frame can be moved relative to the vehicle. A portion of a timber shear, or other implement, is pivotally connected to the support frame so that the timber shear can be lifted and lowered relative to the support frame about a horizontally disposed axis which is substantially parallel to the pivotal axis between the support frame and the vehicle. A stop means is positioned between the support frame and the timber shear to limit upward travel of the timber shear about its pivotal connection to the support frame, and an additional stop means may be provided between the support frame and vehicle to limit upward travel of the support frame about its pivotal axis of connection to the vehicle. Finally, a power operated means for lifting and lowering the timber shear is connected between a portion of the vehicle and at a point on the timber shear which is between the center of gravity of the timber shear and a portion of the vehicle. This placement of a power operated means, as combined with the relationships of the support frame and timber shear to one another, provides for a wide range of positions which can be dictated to the timber shear by a single power operated means connected thereto. In operation, the timber shear may be placed very close to the ground, irrespective of uneven terrain that may be encountered, and trees may be cut so as to leave a minimum amount of wood in a remaining stump. By cutting trees very close to the ground level, it is possible to drive the mobile tree cutting unit over stumps and into any location where additional trees are to be cut in a forest tract. The improved mounting arrangement permits the timber shear to be positively placed in a desired position and at ground level. Actuation of a power operated hydraulic cylinder can lift the timber shear through a series of movements which include (a) an initial lifting of a base end of the timber shear, together with the support frame, about the horizontal axis of connection of the support frame means to the vehicle, (b) a stopping of the upward movement of the support means and a continued lifting of the timber shear about its pivotal connection to the support frame, (c) a continued lifting of the timber shear body into an upwardly directed angle for cross country travel or for cutting on steep inclines. With the improvements of this invention, the shear and its separate support frame means may be adjusted to stop at different positions and in different sequences upon the actuation of a single lifting and lowering power means.

In addition to the improved mounting arrangement discussed above, the invention provides for a tilting of the timber shear about an axis which is at right angles to the horizontally disposed axis of connection between the timber shear and the support frame. For this purpose, a separate support frame means may be attached to the main body of the timber shear so that the shear can be tilted relative to the separate support frame means. A second hydraulic cylinder may be interconnected between the separate support frame means and the main body of the timber shear to effect tilting movements of the shear. By this arrangement, the timber shear can be tilted from a horizontal plane of cutting to a vertical plane of cutting. Thus, the timber shear may be utilized to cut on angles to a horizontal plane, and also, the shear can be operated to cut up a tree or log which is laying on the ground.

These and other features and advantages of the present invention will be discussed in greater detail below, and the detailed discussion will make reference to the following accompanying drawings.

BRIEF DESCRIPTION OF THE DRAWINGS

FIGURE 2 is a top plan view of the mounting arrangement shown in FIGURE 1;

FIGURE 3 is a side elevational view of a timber shear mounted on a vehicle, showing one of the positions of the shear relative to the vehicle;

FIGURE 4 is a view similar to FIGURE 3 and showing an intermediate position of the shear relative to the vehicle;

FIGURE 5 represents a continued upward movement of the timber shear from the positions shown in FIGURES 3 and 4;

FIGURE 6 represents a further continued upward movement of the timber shear from the position shown in FIGURE 5;

FIGURE 7 illustrates a typical upper limit of movement for a timber shear from the positions shown in FIGURES 3 through 6;

FIGURE 8 is a perspective view of a mounted timber shear and vehicle combination, showing the timber shear in a tilted position;

FIGURE 9 is a front elevational view of a timber shear in a horizontal plane of cutting;

FIGURE 10 is a front elevational view similar to FIGURE 9 showing the actuation of a timber shear to a vertical plane of cutting; and FIGURE 11 is an alternative mounting arrangement for a timber shear from that shown in FIGURE 1.

DETAILED DESCRIPTION OF INVENTION

Figure 1:
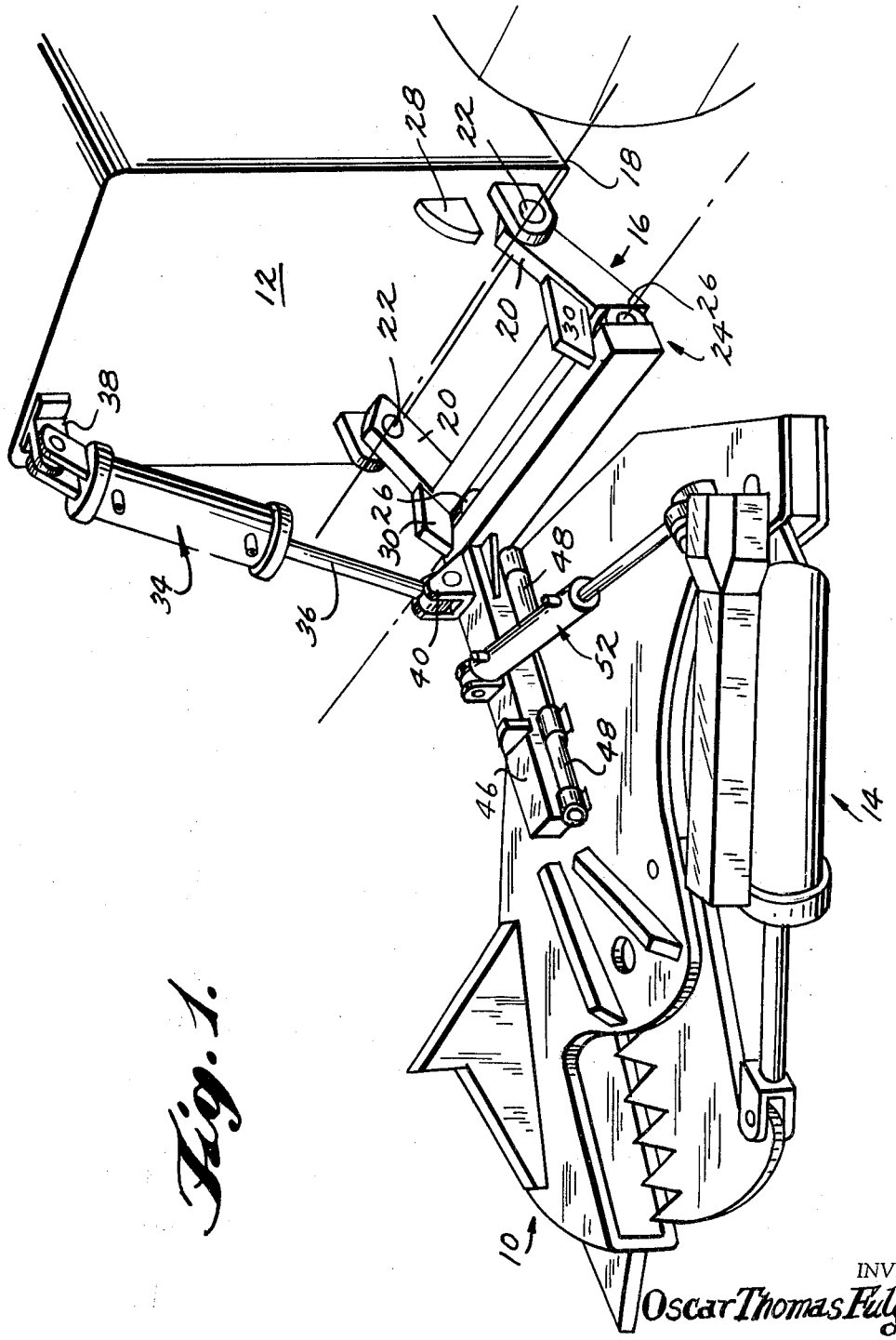
FIGURE 1 is a perspective view of a typical timber shear device mounted onto the front of a vehicle in accordance with the principles of the present invention.

Referring to FIGURE 1, a timber shear 10 is illustrated as being mounted at the front of a vehicle 12. The timber shear may be of any known construction and comprises a device for cutting or slicing through the trunk of a tree in a single stroke of a blade. The blade of the shear is operated by a hydraulic cylinder means 14, and a typical construction for such a shear is described in my copending application entitled "Improved Timber Shear Constructions" as filed May 13, 1968. Although the drawings illustrate the timber shear 10 as being attached to the front of a vehicle 12, it can be appreciated that the shear may be attached to the side or at any other desired position on a vehicle. The arrangement shown in FIGURE 1 provides for a mobile unit which can be driven into an area having standing timber, and the timber can be cut in accordance with present day timbering practices for clearing forested areas. With the improved mounting arrangement of the present invention, the timber shear 10 is mounted to the vehicle 12 in such a way that an operator can place the timber shear 10 very close to the base of a standing tree for cutting the tree at a level close to the ground, irrespective of the unevenness of the terrain. This is an important feature and advantage of mobile units of the type illustrated because less wood is wasted and no large upstanding stumps are left behind by the timbering operation. By eliminating large stumps, timbering equipment and reforesting equipment can be more easily moved over the cut area for conducting subsequent operations which are necessary to good timber and conservation practices.

As shown in the figures, the mounting arrangement of the present invention includes a first support frame means 16 which is connected to the vehicle 12 to move up and down about a first horizontally disposal axis 18. The first support frame means 16 may be connected to the vehicle in any well known manner, and in the illustrated embodiments, the support frame means includes two arm members 20 which are pivotally connected to portions of the vehicle 12 by pins 22. Thus, the support frame means 16 is hinged to the vehicle so as to be rotatable back and forth about the axis 18 relative to the vehicle. A second support frame means 24 is pivotally connected to the first support frame means by hinges 26 or with equivalent connection structures. The second support frame means 24 functions to carry the timber shear 10 and to permit a rotation of the timber shear relative to the first support means about a second horizontally disposed axis through the hinges 26. The first axis 18 and the second axis 26 are generally parallel to each other, as illustrated.

In addition to the supporting structure which has been described above, stop means are positioned between certain portions of the supporting members to limit relative upward travel of the first support means and of the timber shear. A first stop means 28 is positioned between the first support frame means 16 and a portion of the vehicle itself. The first stop means 28 may be in the form of rigid metal plate members welded either to the body of the vehicle or to the support frame means 16, and in either arrangement, the first stop means 28 functions to limit upward travel of the first support frame means 16 about its axis 18. As shown in FIGURES 3 through 7, the first stop means 28 may be positioned to stop upward travel of the first support frame means 16 when the support frame means is essentially in line with the horizontal longitudinal axis of the vehicle. Of course, the first stop means 28 may be shaped and constructed to permit more or less upward travel of the first support means 16, as desired. A second stop means 30 is positioned between the first and second support frame means to limit upward travel of the second support frame means relative to the first support frame means. The second stop means 30 may be constructed as shown in FIGURES 3 through 7 to limit upward travel of the second support frame means 24 by an angular contacting surface 32 which defines a maximum angle of movement between the support frame means 16 and 24. Of course, the second stop means 30 may be positioned on either of the support frame means 16 or 24, and the contacting surface 32 may be constructed to permit a different angular relationship between the two support frame means.

With the structures and relationships which have been just described, it is possible to position the timber shear 10 in a wide range of positions by a single hydraulic cylinder means 34. The hydraulic cylinder means 34 is of any well known construction and includes means for applying hydraulic fluid pressure to opposite sides of a piston carried within a cylinder body. A connecting arm 36 is connected between the piston of the hydraulic cylinder 34 and a portion of the timber shear which is to be lifted and lowered. An application of fluid pressure to one side of the piston contained within the hydraulic cylinder functions to draw the connecting arm 36 inwardly into the cylinder, and an application of fluid pressure on an opposite side of the piston functions to force the connecting arm 36 downwardly out of the hydraulic cylinder. In this manner, positive upward and downward movements are applied to the implement or timber shear by a control of the signal hydraulic cylinder 34.

Referring to the various positions shown in FIGURES 3 through 7, it can be seen that a large number of useful positions can be positively dictated by the single hydraulic cylinder 34. FIGURE 3 illustrates a typical position for a timber shear 10 when a standing tree is to be cut on relatively level terrain. The timber shear 10 is placed onto the ground so as to cut the tree at the lowest possible level, thereby leaving very little stump to interfere with movement of vehicles and other timber handling equipment. The position shown in FIGURE 3 is achieved when an operator forces the connecting arm 36 of the hydraulic cylinder means 34 downwardly to apply pressure on the rear portion of the timber shear implement or its support frame means 24. As illustrated, the hydraulic cylinder means 34 is interconnected between a portion of the timber shear and a portion of the vehicle, and any well known mounting brackets 38 and 40 may be utilized for connecting the hydraulic cylinder means 34. The mounting bracket 40 is positioned on a rearward portion of the implement itself or on a rear portion of a separate support frame means 24, as illustrated. In either case, it is preferred that the mounting bracket 40 be positioned between the center of gravity of the timber shear (or of the combined timber shear and support frame means 24) and a portion of the vehicle. This placement of the mounting bracket 40 determines a pattern of movement for the timber shear, and its associated structures, when the hydraulic cylinder means 34 is actuated.

FIGURE 4 illustrates an intermediate position for the timber shear which is achieved when the connecting arm 36 of the hydraulic cylinder means 34 is drawn upwardly slightly from the position shown in FIGURE 3. Initial upward movement of the connecting arm 36 lifts the rear portion of the timber shear 10 (and its associated structures), and also, a forward portion 42 of the first support frame means 16 is lifted upwardly.

FIGURE 5 illustrates a position which is obtained when upward movement of the connecting arm 36 is continued from the position shown in FIGURE 4. In the FIGURE 5 position, the first support frame means 16 has contacted the first stop means 28 to limit further upward travel of the first support frame means 16. This means that continued upward movement of the connecting arm 36 into the hydraulic cylinder means 34 will begin to lift the tip 44 of the timber shear. The positions shown in both FIGURES 4 and 5 are useful for placing the timber shear on a slope which inclines downwardly and away from the position of the vehicle 12. Thus, the timber shear 10 can be adjusted to fit such slopes and to cut trees on uneven terrain.

FIGURE 6 illustrates a position which is useful when it is desired to lift the timber shear 10 above interfering objects or when the vehicle and shear combination are to be moved for short distances to another tree which is to be cut. It can be appreciated that the position of FIGURE 6 is obtained by continued upward movement of the connecting arm 36 from the position shown in FIGURE 5.

FIGURE 7 illustrates a position which can be obtained when the timber shear 10 reaches its upper limit of travel, as determined by the second stop means 30 and its contacting surface 32. The position shown in FIGURE 7 is useful for cross country travel, and also, it can be used when cutting trees on a slope which inclines upwardly and away from the front of the vehicle 12.

From the position shown in FIGURE 7, the timber shear 10 can be lowered by lowering the connecting arm 36 relative to the hydraulic cylinder means 34, and this is accomplished by either releasing fluid pressure on the lower side of the piston associated with the hydraulic cylinder means or by applying positive pressure to the upper side of the piston. The weight of the timber shear, and its associated structures, can be used to lower the shear to a ground working level, but it is also desirable, and possible, to apply a positive pressure to the downward movement of the timber shear 10. When trees are being cut and cleared from a forested area, it is often necessary to work around or over small brush and branches which have been trimmed from trees. By placing the timber shear 10 on top of any interfering brush or branches and then applying a positive downward pressure, it is possible to crush such brush or branches sufficiently to advance the vehicle into an area where trees are to be cut.

In addition to the features just described, the timber shear 10 may also be mounted to rotate about an axis which is at right angles to the horizontal axes 18 and 26. This is accomplished by pivotally mounting the timber shear 10 to a portion 46 of the second support frame means, and the pivotal axis of such mounting may be generally at right angles to the horizontally disposed axes 18 and 26. Hinges, or other devices for providing a pivotal mounting, are indicated at 48. FIGURES 8 through 10 illustrate the additional features which are attained by mounting the timber shear 10 for tilting movements about an axis extending at right angles to the axes 18 and 26.

FIGURE 8 is a perspective view of a mobile shear unit having a timber shear 10 mounted to a vehicle in the manner described with reference to FIGURES 1 through 7. In addition, the timber shear 10 is shown as being tilted or rotated about an axis defined by hinges 48, and FIGURE 8 illustrates a vertical plane of cutting for the timber shear in its tilted position. By providing a range of tilting movement for the timber shear, the cutting plane can be adjusted to accommodate uneven terrain, and the shear can be used for cutting up logs or trees which are laying on the ground after a timbering operation. From the position shown in FIGURE 8, the tip end 44 of the shear can be lowered and forced underneath any log or tree laying on the ground. Then, the blade of the timber shear can be actuated to slide through the log or tree by means of hydraulic control devices operating the hydraulic cylinder means 14. The hydraulic cyclinder means 14 functions to advance and retract a cutting blade portion of the shear towards and away from a tree-contacting extension of the shear, as is well known in this art. A separate hydraulic cylinder means 52 is interconnected between a portion of the support frame means 24 and the main body of the timber shear 10 so that the timber shear can be lifted and lowered about the axis defined by its hinges 48. FIGURES 8 and 10 illustrate a maximum lift position for the timber shear which results when a connecting arm 54 is fully retracted within the hydraulic cylinder means 52. An advancement of the connecting arm 54 outwardly from the hydraulic cylinder means 52 results in a lowering of the timber shear to a horizontal cutting plane, as shown in FIGURE 9. Suitable hydraulic control devices are associated with the hydraulic cylinder means 52 to positively advance and retract its connecting arm 54, as are well known in this art. All control devices for each of the hydraulic cylinder means 14, 34, and 52 can be placed in a position where an operator of the vehicle can easily command all controls from his driving position within the vehicle. The vehicle 12 which is illustrated in FIGURE 8 also includes protective framing members 56 for protecting the operator from falling trees or limbs, and the driving compartment of the vehicle may be enclosed, and heated and air-conditioned, if desired.

FIGURE 11 illustrates an alternative embodiment for mounting a timber shear 10 relative to a support frame means 16. As illustrated, the support frame means 16 is pivotally connected to a portion of the vehicle to move up and down about a first horizontal axis 18. In addition, the timber shear itself, or associated supporting structure, is attached to the first support frame means 16 to move about a second horizontally disposed axis 26 which is generally parallel to the first axis 18. One or more power operated hydraulic cylinder means 34 may be interconnected between a portion of the vehicle and a part of the timber shear 10 which is between the center of gravity of the shear and the vehicle. Stop members 30 are provided to limit upward travel of the timber shear 10 relative to the support frame means 16, and additional stop members may be provided for limiting upward travel of the support frame 16 relative to the vehicle. The stop members 30 are illustrated as being connected to the main body of the timber shear so as to extend over portions of the support frame means 16. Alternatively, the stop members 30 could be welded to the support frame means 16 so as to extend over the main body of the shear, and then, the hydraulic cylinder means 34 would be interconnected between a portion of the vehicle and a portion of the main body of the shear. Retracting movements of the hydraulic cylinder means 34 of the FIGURE 11 embodiment result in a lifting movement of the timber shear 10 about its axis 26. When the shear reaches its limit of travel, as determined by the stop members 30, the combined shear and support frame means 16 can be further lifted upwardly. As with the embodiment described in FIGURES 1 through 10, the timber shear can be positively displaced downwardly whenever desired.

Having described the features and structures of the present invention, it can be seen that a substantially improved arrangement is provided for mounting and controlling a timber shear relative to a vehicle. In contrast to prior art arrangements, the present invention provides for a relatively simple and rugged construction which can be more easily operated with fewer controls. The number of power operated hydraulic cylinders, and other similar devices, has been substantially reduced by the particular relationships and constructions provided by this invention, and this results in more economical manufacture and operation of a mobile timber shear unit. The timber shear unit provided by this invention can operate efficiently in the field to cut trees very close to the ground irrespective of uneven terrain conditions.

Although the invention has been described with reference to particular embodiments, it can be appreciated that certain equivalent structures and modifications can be substituted for the structures described herein. It is intended that all equivalent and obvious variations from what has been described are to be included within the scope of this invention.

What is claimed is:

1. An improved construction for mounting an implement on a vehicle so that the implement can be moved relative to the vehicle, comprising:
a support frame means pivotally connected to structure associated with the vehicle so that the support frame means can move about a first horizontally disposed axis relative to the vehicle, and first stop means positioned to limit upward travel of the support frame means about said first horizontally disposed axis,
pivotal connection means for connecting a portion of an implement to a portion of said support frame means so that the implement can be moved relative to said support frame means about a second horizontally disposed axis which is substantially parallel to said first horizontally disposed axis, and a second stop means positioned between said support frame means and said implement to limit upward travel of the implement about its pivotal connection to the support frame means, and
a power operated means connected between a portion of the implement and a portion of said vehicle for lifting and lowering the implement relative to said support frame means and said vehicle in accordance with a pattern of movements about said first and second horizontally disposed axes.

2. The improvement of claim 1 wherein said power operated means comprises a double-acting hydraulic cylinder means which is connected between a point on a portion of the vehicle and a point on a portion of said implement which is between the vehicle and the center of gravity of the implement.

3. The improvement of claim 1 wherein said implement is connected to said support frame means by a second support frame means which carries the implement and which is pivotally connected to said support frame means to move the implement and the second support frame about said second horizontally disposed axis.

4. The improvement of claim 2 wherein said first stop means is positioned to stop upward travel of said support frame means prior to the time that said implement is stopped in its upward travel by said second stop means, when said hydraulic cylinder means is actuated to lift the implement and its pivotally connected support frame means.

5. The improvement of claim 1 wherein said implement comprises a timber shear device and wherein said first stop means is positioned to stop upward travel of said support frame means when said support frame means and said vehicle are disposed in a substantially horizontal plane.

6. The improvement of claim 5 wherein said second stop means is positioned to permit continued upward travel of the timber shear device after said first stop means has limited upward travel of said support frame means.

7. The improvement of claim 3 wherein said second support means is pivotally connected to said implement along a third axis which is at a right angle to said second horizontally disposed axis, said third axis being substantially horizontally disposed when said implement is positioned in a horizontal plane.

8. The improvement of claim 7 wherein a second power operated means is connected between a portion of said second support means and a portion of said implement so as to rotate the implement about said third axis when said second power operated means is actuated.

9. The improvement of claim 8 wherein a third stop means is positioned between said second support means and said implement to limit travel of said implement about said third axis.

10. The improvement of claim 8 wherein said implement comprises a timber shear device which can be operated between horizontal and vertical attitudes about said third axis so that timber can be cut while standing or while laying on the ground.

11. An improved construction for mounting a timber shear to a vehicle so that movements of the timber shear relative to the vehicle can be controlled, comprising:
support frame means pivotally connected to structure associated with the vehicle so that the support frame means can move about a first horizontally disposed axis relative to the vehicle,
pivotal connection means for connecting a portion of a timber shear to a portion of said support frame means so that the timber shear can be lifted and lowered relative to said support frame means about a second horizontally disposed axis which is substantially parallel to said first horizontally disposed axis, and a stop means positioned between said support frame means and said timber shear to limit upward travel of the timber shear about its pivotal connection to the support frame means, a power operated means connected to a portion of the timber shear, at a point which is between the center of gravity of the timber shear and said vehicle, and to a portion of the vehicle for positively lifting and lowering the timber shear relative to the vehicle.

12. The improved construction of claim 11 wherein said timber shear is pivotally connected to said support frame means by a second support frame means, said second support frame means being pivotally connected to the timber shear along a third axis which is at a right angle to said second horizontally disposed axis, and including second power operated means between said second support frame means and said timber shear for tilting said timber shear about said third axis.

13. The improved construction of claim 11 wherein said stop means is positioned to stop upward travel of said timber shear about said second horizontally disposed axis before said first named support frame means reaches an upper limit of travel about its first horizontally disposed axis.

14. The improvement of claim 11 wherein said stop means is positioned to stop upward travel of said timber shear about said second horizontally disposed axis after said first named support frame means reaches an upper limit of travel about its first horizontally disposed axis.

References Cited

UNITED STATES PATENTS

| | | | |
|---|---|---|---|
| 2,876,816 | 3/1959 | Busch et al. | 144—309 |
| 3,327,745 | 6/1967 | Meece et al. | 144—34 |
| 3,382,899 | 5/1968 | White | 144—34 |

GERALD A. DOST, Primary Examiner

U.S. Cl. X.R.

144—3